(No Model.) 2 Sheets—Sheet 1.
J. N. KAILOR & M. T. REEVES.
CLOVER HULLER FEEDER.
No. 514,193. Patented Feb. 6, 1894.
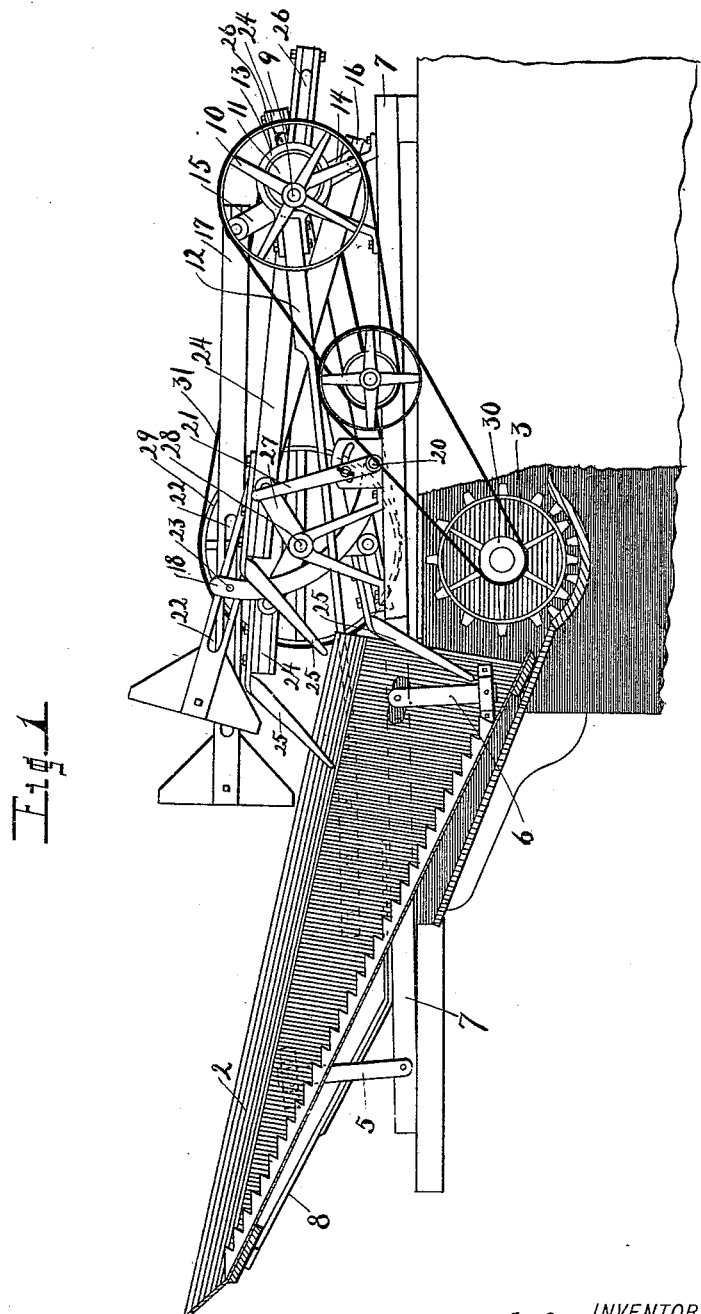
WITNESSES:
A. M. Hood.
E. K. Hood.
INVENTORS:
John N. Kailor
Marshal T. Reeves,
BY H. P. Hood,
ATTORNEY.

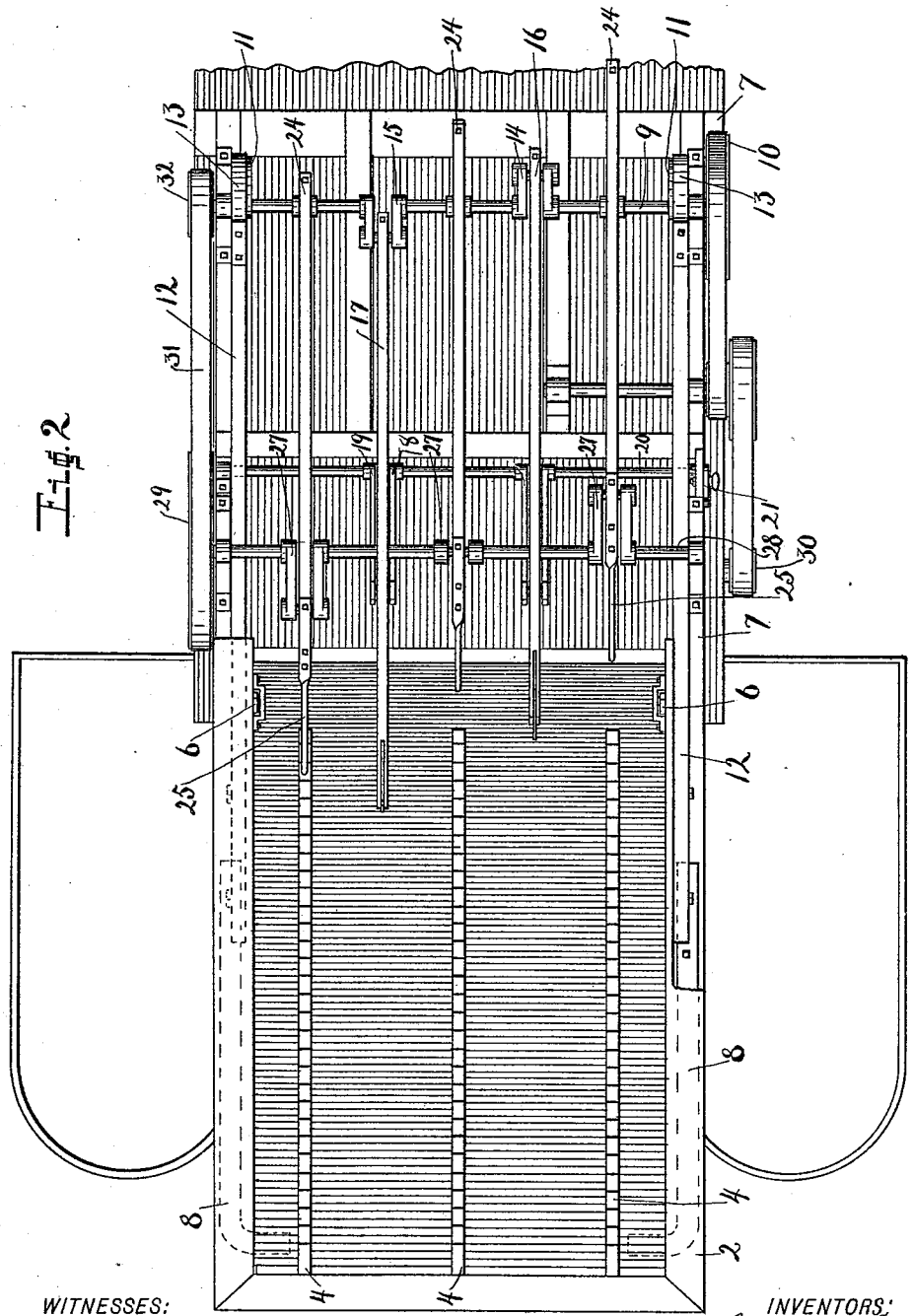

UNITED STATES PATENT OFFICE.

JOHN N. KAILOR AND MARSHAL T. REEVES, OF COLUMBUS, INDIANA, ASSIGNORS TO REEVES & CO., OF SAME PLACE.

CLOVER-HULLER FEEDER.

SPECIFICATION forming part of Letters Patent No. 514,193, dated February 6, 1894.

Application filed October 2, 1893. Serial No. 487,002. (No model.)

*To all whom it may concern:*

Be it known that we, JOHN N. KAILOR and MARSHAL T. REEVES, citizens of the United States, residing at Columbus, in the county of Bartholomew and State of Indiana, have invented a new and useful Improvement in Clover-Huller Feeders, of which the following is a specification.

Our invention relates to an improved device for feeding the material to the thrashing-cylinder of a clover-huller or other thrashing machine.

The objects of our improvement are, to provide means for disentangling and spreading the material, and for forcing it in a steady supply toward the thrashing-cylinder without the use of shafts or belts in the path of the material.

The accompanying drawings illustrate our invention.

Figure 1 represents a plan of the feeding device in position on the forward end of a clover-hulling machine. Fig. 2 represents a side elevation of the same, a portion of the side of the clover-huller having been removed to show the thrashing-cylinder, and the hopper being shown in section.

In the drawings, 2, represents a hopper, formed preferably of sheet metal, having its bottom inclined toward the thrashing cylinder, 3, and provided with a series of ratchet-toothed bars, 4. Said hopper is supported by means of links, 5, and, 6, upon a portable frame, 7, which carries the feeding mechanism and is adapted to rest upon the top of the clover-huller-casing above the thrashing cylinder, the hopper being arranged in the throat leading thereto. A pair of links 5 and links 6 are provided at the opposite sides and ends of the hopper, the lower ends of links 5 and the upper ends of links 6 being pivoted to the frame, and their opposite ends being pivoted to the sides of the hopper. The outer end of the hopper is further supported upon the frame by means of a pair of flat springs, 8, 8, which are secured at one end to the frame and are turned at their other ends so as to project beneath the outer end of the hopper. The inner end of the hopper rests at its lower end upon the throat of the clover-huller, near the thrashing cylinder. A reciprocating movement toward and from the thrashing-cylinder is imparted to the hopper by means of a shaft, 9, mounted upon the frame 7, provided with a driving pulley, 10, and a pair of eccentrics, 11, 11. Said eccentrics are connected with the hopper by means of connecting-bars, 12, 12, which are bolted at one end to the sides of the hopper and are provided at the other end with yokes, 13, 13, which embrace the eccentrics. At the same time said reciprocating movement of the hopper is converted into a vertically vibrating movement by means of the links 5 and 6.

Shaft 9 is provided with a pair of cranks, 14, and, 15, arranged diametrically opposite upon the shaft. A pair of push-bars, 16, and, 17, are pivoted at one end to said cranks and are supported near their opposite ends upon a pair of curved arms, 18, and, 19, which are rigidly attached to a rock-shaft, 20, mounted in suitable bearings on the main frame and provided with an adjusting lever, 21, by means of which the free ends of arms 18 and 19 may be vertically adjusted. Push-bars 16 and 17 are each provided near their forward ends with a slotted bearing, 22, which rests upon a stud, 23, arranged in the bifurcated upper ends of the arms 18 and 19. Arranged between and alternately with the push-bars, are rake-bars, 24, each having a single tooth, 25, which projects downward into the hopper. Said rake-bars are each provided at one end with a slotted bearing, 26, which rests upon shaft 9. The opposite ends of said rake-bars are pivoted to and supported by cranks, 27, radiating at intervals from a crank-shaft, 28, which is mounted in suitable bearings on the main frame and is provided with a driving-pulley, 29. The arrangement of cranks 27 and rake-bars 24 is such that the rakes are successively raised and thrown forward and then lowered into the hopper and drawn inward toward the thrashing-cylinder, the rake-teeth operating not only to draw the material toward the cylinder but to retain it from being drawn into the cylinder too rapidly.

Shaft 9 is driven by means of a train of belts and pulleys connecting pulley 10 with a pulley, 30, mounted on the shaft of the thrashing-cylinder. Shaft 28 is driven by means of a belt, 31, connecting pulleys, 32, and, 29, mounted respectively upon shafts 9 and 28.

In operation, the material, being thrown into the hopper, moves by the combined force of gravitation and the vibrating, reciprocating movement of the hopper, toward the thrashing-cylinder. As it approaches the cylinder the mass is seized by the rakes 25 successively and drawn slowly toward the cylinder without allowing the material to slip from beneath them, while at the same time the upper portion of the mass is turned and pushed backward by the quickly moving push-bars 16 and 17. The mass of the material is thus, to a considerable extent, reduced to a substantially uniform thickness and is spread evenly across the entire width of the throat leading to the thrashing-cylinder.

We claim as our invention—

1. In a clover-huller-feeder, the combination of the main-frame, the shaking, vertically oscillating hopper suspended in said frame, the series of rake-bars mounted above said hopper, means for imparting a reciprocating, rocking movement to said rake-bars, the push-bars also mounted above the hopper and arranged alternately with the rake-bars, and means for imparting a reciprocating, rocking movement to said push-bars, all arranged to co-operate substantially as and for the purpose set forth.

2. In a clover-huller feeder, the combination with the main-frame, the hopper attached thereto, the crank-shaft 9 mounted thereon, and the push-bars pivoted at one end to the cranks of said shaft, and each provided, near its opposite end, with the slotted bearing 22, said push-bars being arranged to traverse the space above the hopper, of the rock-shaft 20, provided with the arms 18 and 19 arranged to engage, said slotted bearings, and means for adjustably securing the rock-shaft in position, whereby the operative ends of the push-bars are adjusted vertically relatively to the hopper, as set forth.

3. In a clover-huller feeder, the combination with the main-frame and a hopper arranged therein to conduct material to the thrashing cylinder of a clover-huller, of two series of bars each carrying at one end means for engaging the material to be fed to the thrashing cylinder and arranged to traverse the hopper longitudinally, and mechanism for imparting a rocking, reciprocating, longitudinal movement to all of said bars, the arrangement being such that one of the series of reciprocating bars operates to draw the material directly toward the thrashing cylinder, while the other series operates to push the material directly away from the cylinder, all substantially as set forth.

4. In a clover-huller feeder, the combination of the portable main-frame, the oscillating hopper suspended therein, the multiple crank-shaft 28 mounted on said frame, the shaft 9, also mounted on the frame, and the series of rake-bars each connected at one end by a slotted bearing with the shaft 9, and connected near the opposite end with one of the cranks of shaft 28, said rake-bars being arranged to traverse the hopper longitudinally and to draw the material toward the thrashing cylinder of the clover-huller, as set forth.

JOHN N. KAILOR.
MARSHAL T. REEVES.

Witnesses:
B. M. HUTCHINS,
HENRY D. YODER.